United States Patent
Ito

(10) Patent No.: US 10,139,654 B2
(45) Date of Patent: Nov. 27, 2018

(54) OPTICAL APPARATUS THAT REDUCES DRIVING NOISED BY ADJUSTING LIGHT TRANSMISSIVITY AND CAMERA SYSTEM

(71) Applicant: CANON KABUSHIKI KAISHA, Tokyo (JP)

(72) Inventor: Shu Ito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 15/268,910

(22) Filed: Sep. 19, 2016

(65) Prior Publication Data

US 2017/0094137 A1 Mar. 30, 2017

(30) Foreign Application Priority Data

Sep. 25, 2015 (JP) ................. 2015-188318
Sep. 13, 2016 (JP) ................. 2016-178508

(51) Int. Cl.
- H04N 5/217 (2011.01)
- G02F 1/01 (2006.01)
- H04N 5/357 (2011.01)
- H04N 5/232 (2006.01)

(52) U.S. Cl.
CPC ....... G02F 1/0121 (2013.01); H04N 5/23209 (2013.01); H04N 5/23245 (2013.01); H04N 5/357 (2013.01); H04N 5/3572 (2013.01)

(58) Field of Classification Search
CPC .......................... H04N 5/23209; G02F 1/0121
See application file for complete search history.

(56) References Cited

U.S. PATENT DOCUMENTS

| 8,525,925 B2* | 9/2013 | Jannard ............... H04N 5/2252 348/372 |
| 2004/0027479 A1* | 2/2004 | Ikeda ................. H04N 5/23232 348/363 |

(Continued)

FOREIGN PATENT DOCUMENTS

| JP | 2005348358 A | 12/2005 |
| JP | 2006106509 A | 4/2006 |

(Continued)

OTHER PUBLICATIONS

Smith, Elliot; "The Holy Grail of DSLR Filmmaking—Genus Show Prototype Lens Adapter With Built-In Electronic ND Filter" Sep. 15, 2015; www.newsshooter.com; pp. 1-4; https://www.digitalrev.com/article/genus-show-prototype-lens-adapter-with-built-in-electronic-nd-filter (Year: 2015).*

Primary Examiner — Gary C Vieaux
(74) Attorney, Agent, or Firm — Rossi, Kimms & McDowell LLP

(57) ABSTRACT

An optical apparatus configured to guide light from an object to an image pickup element includes a first light amount adjustment unit configured to change transmissivity or the light from the object through change in physical property thereof. Then, in recording, a second light amount adjustment unit configured to mechanically change an area through which the light from the object passes is prevented from being driven but the first light amount adjustment unit is driven to adjust an amount of the light from the object entering the image pickup element.

14 Claims, 9 Drawing Sheets

(56) References Cited

U.S. PATENT DOCUMENTS

| | | | | |
|---|---|---|---|---|
| 2005/0141890 A1* | 6/2005 | Ohkura | ............... | G03B 7/085 |
| | | | | 396/246 |
| 2013/0188074 A1* | 7/2013 | Nakabayashi | ......... | H04N 9/735 |
| | | | | 348/223.1 |
| 2013/0308934 A1* | 11/2013 | Yamanaka | ............. | G03B 13/34 |
| | | | | 396/133 |
| 2014/0300805 A1* | 10/2014 | Davis | .................... | H04N 5/238 |
| | | | | 348/362 |
| 2015/0177594 A1* | 6/2015 | Weber | ..................... | G03B 9/02 |
| | | | | 396/505 |
| 2015/0281547 A1* | 10/2015 | Terasawa | ............ | H04N 5/2357 |
| | | | | 348/226.1 |

FOREIGN PATENT DOCUMENTS

| | | | |
|---|---|---|---|
| JP | 2008242230 | A | 10/2008 |
| JP | 2012203142 | A | 10/2012 |

\* cited by examiner

OPTICAL APPARATUS THAT REDUCES DRIVING NOISED BY ADJUSTING LIGHT TRANSMISSIVITY AND CAMERA SYSTEM

BACKGROUND OF THE INVENTION

Field of the Invention

The present invention relates to an optical apparatus, e.g., an adapter which includes a light amount adjustment unit configured to change transmissivity of imaging light through change in physical property thereof, an interchangeable lens, or a camera main body, and to a camera system using the same.

Description of the Related Art

For the purpose of connecting interchangeable lenses having different mount shapes to a camera main body, an adapter has been hitherto used. Reasons for the different mount shapes include difference in image size and difference in flange focal distance.

In recent years, compact and lightweight mirrorless single-lens cameras in which a mirror unit of a single-lens reflex camera is removed are becoming widespread. Compared with a single-lens reflex camera, a mirrorless single-lens camera is designed to have a shorter flange focal distance, and has a different mount shape.

Due to the removal of the mirror unit, the mirrorless single-lens camera described above is optimized for a contrast AF system, and is thus suitable for taking moving images, while a single-lens reflex camera uses both the contrast AF system and a phase-difference AF system. With such background circumstances, as mirrorless single-lens cameras become widespread, there is an increasing demand for taking moving images with a digital camera.

Meanwhile, a stop configured to change an area of a hole through which light passes in order to adjust the amount of incident imaging light is indispensable for an interchangeable lens. As the stop, there is often used a mechanical stop (that mechanically changes the area through which the imaging light passes) with a stepping motor or the like serving as a drive source thereof. A mechanical stop structurally produces driving noise. Therefore, when a moving image is taken together with sound recording, a problem that the driving noise is also recorded arises. Further, the driving noise caused by the mechanical stop is produced not only when a moving image is taken but also when a still image is taken. Under the circumstances where quietness is required, e.g., in a concert hall, the driving noise is not preferred.

In Japanese Patent Application Laid-Open No. 2012-203142, there is disclosed an attachment lens device including, in an attachment mounted between an imaging lens and a camera main body, a stop unit that can change an aperture diameter to limit the amount of incident light from the imaging lens.

In Japanese Patent Application Laid-Open No. 2012-203142, the attachment lens device includes the stop that can change the aperture diameter. The stop is mounted between a master lens and the camera main body, and thus is arranged at a position different from the position of a focal point in the imaging lens. In this case, the arrangement of the stop at a position different from the position of the focal point in the imaging lens causes vignetting in which a periphery of an image pickup surface becomes darker.

Further, when a mechanical stop is used as a stop in an attachment lens, there arises a problem in that driving noise is caused when a moving image or a still image is taken.

SUMMARY OF THE INVENTION

An object of the present invention is to provide an optical apparatus that reduces vignetting due to light amount adjustment in taking an image and that can reduce driving noise caused in light amount adjustment when a moving image or a still image is taken, and a camera system using the same.

In order to achieve the object described above, according to one embodiment of the present invention, there is provided an optical apparatus configured to guide light from an object to an image pickup element, the optical apparatus including a first light amount adjustment unit configured to change transmissivity of the light from the object through change in physical property thereof, in which, in recording, the first light amount adjustment unit is driven to adjust an amount of the light from the object entering the image pickup element, while a second light amount adjustment unit configured to mechanically change an area through which the light from the object passes is prevented from being driven.

Further, according to one embodiment of the present invention, there is provided a camera system including: an optical apparatus configured to guide light from an object to an image pickup element and including a first light amount adjustment unit configured to change transmissivity of the light from the object through change in physical property thereof; an imaging optical system configured to guide the light from the object to the image pickup element; a second light amount adjustment unit configured to mechanically change an area through which the light from the object passes; and a control unit configured to control the first light amount adjustment unit and the second light amount adjustment unit, in which, in recording, the second light amount adjustment unit is prevented from being driven but the first light amount adjustment unit is driven to adjust an amount of the light, from the object entering the image pickup element.

Further features of the present invention will become apparent from the following description of exemplary embodiments with reference to the attached drawings.

BRIEF DESCRIPTION OF THE DRAWINGS

FIG. 10 is a flow chart for illustrating light amount adjusting operation when a quietness SW of the camera system according to the fifth embodiment is ON.

DESCRIPTION OF THE EMBODIMENTS

Exemplary embodiments of the present invention are hereinafter described in detail with reference to the attached drawings.

[First Embodiment]
(Camera System)

Figure 1:
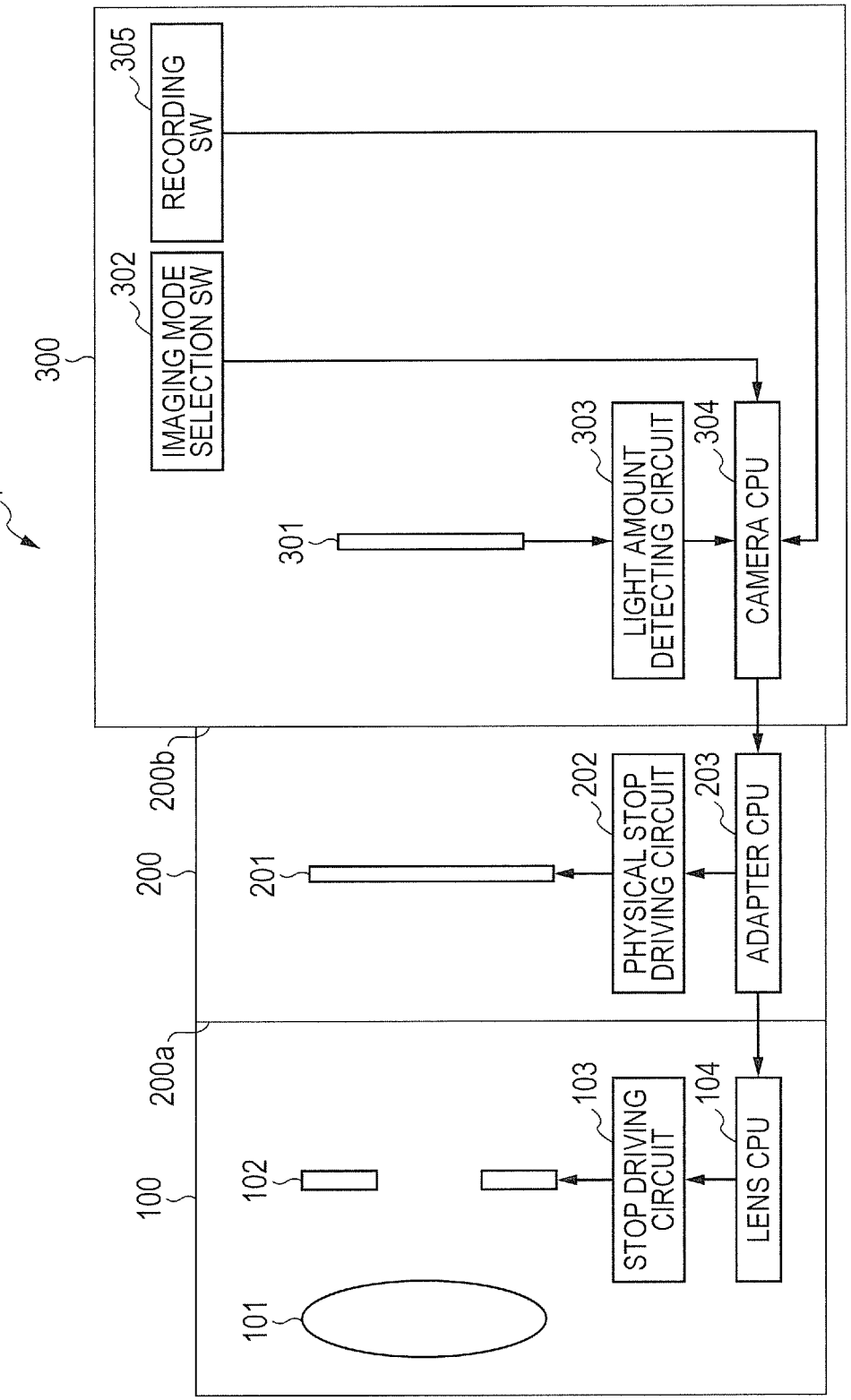
FIG. 1 is a schematic view of a camera system including an adapter, an interchangeable lens, and a camera main body according to a first embodiment of the present invention.

FIG. 1 is a schematic view of a camera system serving as an image pickup apparatus including an adapter, an interchangeable lens, and a camera main body as an optical apparatus according to an embodiment of the present invention. A camera system 1 includes an interchangeable lens 100 serving as an imaging optical system, a camera main body 300, and an adapter 200 mountable between the interchangeable lens 100 and the camera main body 300.

The interchangeable lens 100 includes an imaging lens 101 and a mechanical stop (mechanical diaphragm) 102 serving as a second light amount adjustment unit configured to mechanically change an area through which imaging light passes, and further includes, for example, a microcomputer so as to be able to communicate with the camera main body 300 and with the adapter 200. The microcomputer of the interchangeable lens 100 includes, for example, a lens CPU 104 and a memory (not shown). In the memory, information on the interchangeable lens 100 (for example, a focal length, brightness, and a range of change in aperture diameter of the stop) is stored in advance.

The adapter 200 includes a first mount surface 200a to which the interchangeable lens 100 is mounted, and a second mount surface 200b to which the camera main body 300 is mounted. The adapter 200 further includes a physical stop (physical diaphragm) 201 serving as a first light amount adjustment unit configured to change transmissivity of imaging light through change in physical property thereof in a region on which the imaging light is incident, a physical stop driving circuit 202, and an adapter CPU 203. In this embodiment, as the physical stop 201, an electrochromic element configured to change light transmissivity (light transmission state) thereof by being applied with an electrical signal (voltage application) is used, but a liquid crystal element or the like may also be used.

The camera main body 300 includes an image pickup element 301 configured to receive imaging light, an imaging mode selection switch 302 that can select an imaging mode among a plurality of imaging modes, a light amount detecting circuit 303, a camera CPU 304, and a recording switch 305. The imaging mode selection switch 302 configured to select an imaging mode is a selection switch, e.g., a dial switch, and switching between a still image mode and a moving image mode can be performed. The recording switch 305 is a push button or the like, and switching between ON and OFF of recording in the moving image mode can be performed.

With reference to FIG. 1, an object is captured by the interchangeable lens 100, and an image thereof passes through the imaging lens 101, the mechanical stop 102 configured to change the aperture diameter thereof, and the physical stop 201 in the adapter 200 and is formed on the image pickup element 301 in the camera main body 300. In the camera system of this embodiment, an output signal from the image pickup element 301 is used to acquire a still image or a moving image. In this way, in the camera system of this embodiment, the light amount adjustment units include the mechanical stop 102 of the interchangeable lens 100 and the physical stop 201 of the adapter 200.

(Mechanical Stop)

Figure 2:
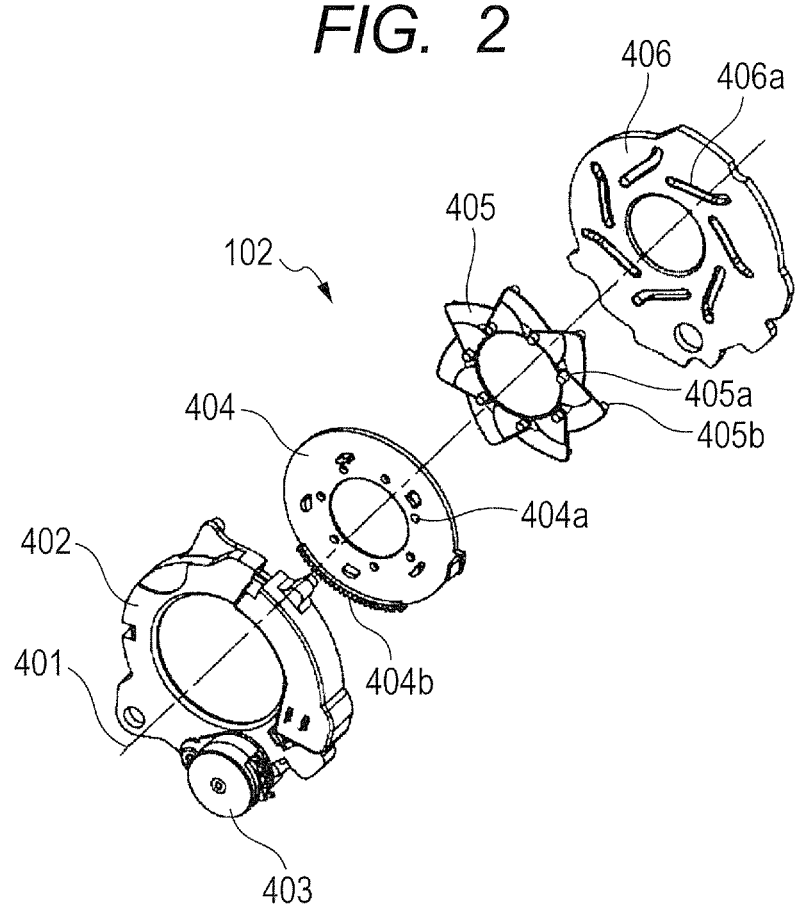
FIG. 2 is a perspective view for illustrating a configuration of a mechanical stop of the interchangeable lens of the camera system according to the first embodiment of the present invention.

FIG. 2 is an exploded perspective view of the mechanical stop 102. The mechanical stop 102 includes a plurality of stop blades 405 configured to form a stop aperture. Through displacement of the plurality of stop blades 405 in directions crossing an optical axis 401, the area of the stop aperture can be adjusted. Therefore, the amount of incident light through the imaging lens 101 may be adjusted after passing through the mechanical stop 102.

The stop blades 405 include pin portions 405a and 405b. The pin portions 405a are inserted into hole portions 404a, respectively, formed in a rotating plate 404. The pin portions 405b are slidably inserted into cams 406a, respectively, formed in a cam plate 406. The rotating plate 404 is rotatably fitted to a circular opening formed in a base plate 402, and includes a gear portion 404b.

Rotation of an output shaft of a stepping motor 403 fixed to the base plate 402 is transmitted to the rotating plate 404 via a gear (not shown) mounted to the output shaft of the stepping motor 403 and the gear portion 404b, and the rotating plate 404 rotates about the optical axis 401. Through rotation of the rotating plate 404, the stop blades 405 slide along the cams 406a, respectively. This adjusts the area of the stop aperture.

In this case, in the still image mode, driving of the stop blades 405 of the mechanical stop 102 is controlled (at this time, driving of the physical stop 201 is prohibited, and driving of the physical stop 201 is not controlled). Meanwhile, in the moving image mode, the mechanical stop 102 structurally produces driving noise when driven, and thus there arises a problem that the driving noise is recorded.

(Physical Stop)

Figure 3:
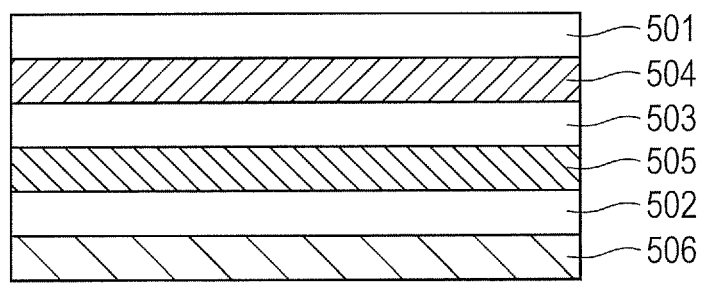
FIG. 3 is a schematic view for illustrating a configuration of a physical stop of the adapter of the camera system according to the first embodiment of the present invention.

A configuration of the physical stop 201 is illustrated in FIG. 3. In the physical stop 201, an insulating layer 503 of $Ta_2O_5$, $SiO_2$, or the like is formed between two transparent electrode layers 501 and 502 each formed of a coating or the like. A first coloring layer 504 of $Ir(OH)_x$, $Ni(OH)_x$, or the like and a second coloring layer 505 of $WO_3$, $MoO_3$, or the like are laminated with the insulating layer 503 sandwiched therebetween. Those layers are formed on a glass substrate 506.

When a voltage is applied between the transparent electrodes 501 and 502, the two coloring layers 504 and 505 are simultaneously colored to exhibit various colors, and light transmission properties thereof vary. The coloring depends on the amount of charge supplied from a power supply from which the voltage is applied between the electrodes, and when the voltage achieves a state of equilibrium, a current no longer flows. Thus, it seems as if a capacitor is operating in terms of a circuit. This state is held even after the power supply is removed, insofar as the charge is not moved to the outside. Therefore, the electrochromic element itself has the function of a memory.

The memory time almost depends on leakage to an external circuit. The structure itself can hold data for more than ten hours as it is, and thus, a memory is not necessarily required in normal use. Further, in order to perform decoloring, it is enough to remove the applied charge, and thus, it is enough to connect a resistor or to apply an inverse voltage. The light transmissivity of the physical stop 201 varies through change in physical property thereof through voltage application thereto, and thus, no driving noise is caused.

Therefore, according to this embodiment, driving of the mechanical stop 102 of the interchangeable lens 100 is prohibited (driving of the mechanical stop is not controlled) in the moving image mode, and the light amount is adjusted through control of the driving of the physical stop 201 of the adapter 200.

(Light Amount Adjusting Operation Flow when Moving Image is Taken according to this Embodiment)

Figure 4:
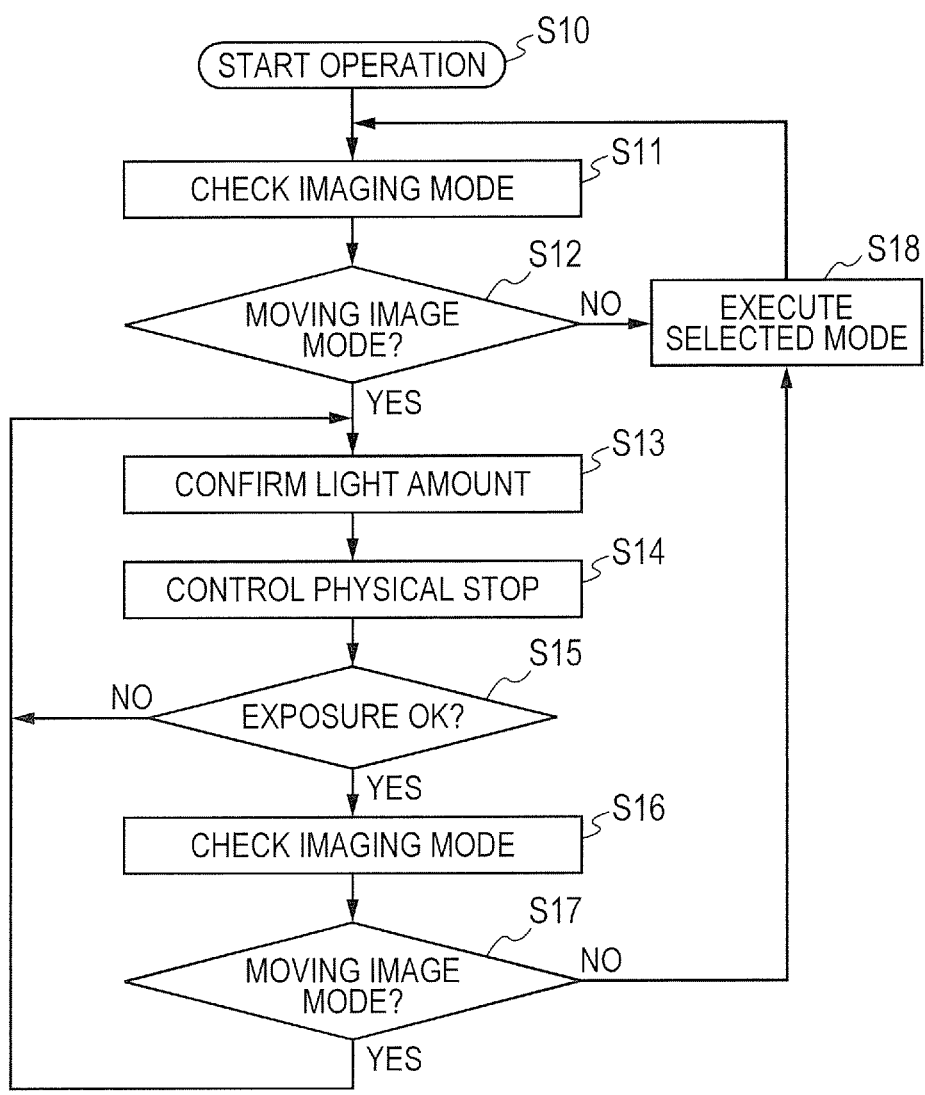
FIG. 4 is a flow chart for illustrating light amount adjusting operation in a moving image mode of the camera system according to the first embodiment.

FIG. 4 is a flow chart for illustrating light amount adjusting operation when a moving image is taken of the camera system 1 according to this embodiment. First, in Step (denoted as S in FIG. 4) 10, operation of the interchangeable lens 100, the adapter 200, and the camera main body 300 is started. Then, in Step 11, the imaging mode set in the camera main body 300 is checked.

Then, in Step 12, whether or not the imaging mode is the moving image mode is determined. When the imaging mode is the moving image mode, the process proceeds to Step 13. When a mode other than the moving image mode is selected, the process proceeds to Step 18. In Step 13, the amount of light entering the image pickup element 301 is confirmed. In Step 14, from the light amount confirmed in Step 13, the extent to which the transmissivity of the physical stop 201 is to be increased or reduced is calculated by the adapter CPU 203, and a signal is output from the physical stop driving circuit 202 to the physical stop 201.

In Step 15, whether the exposure is at an appropriate level (OK) or not (NG) is determined. In the case of OK, the process proceeds to Step 16. In the case of NO, the process returns to Step 13. In Step 16, the imaging mode is checked again. In Step 17, whether or not the imaging mode is the moving image mode is determined. When the imaging mode is the moving image mode, the process returns to Step 13. When a mode other than the moving image mode is selected, the process proceeds to Step 18.

As described above, in the moving image mode, the light amount is adjusted always using only the physical stop 201, and driving of the mechanical stop 102 is prohibited. Therefore, even when recording is performed in the moving image mode, driving noise of a stop caused through light amount adjustment can be prevented from being recorded. Further, the light amount is adjusted not through change of the area through which the light passes but through change of the transmissivity, and thus, vignetting is not increased even when the physical stop 201 is arranged at a position different from the position of the focal point in the imaging lens.

[Second Embodiment]

Figure 5:
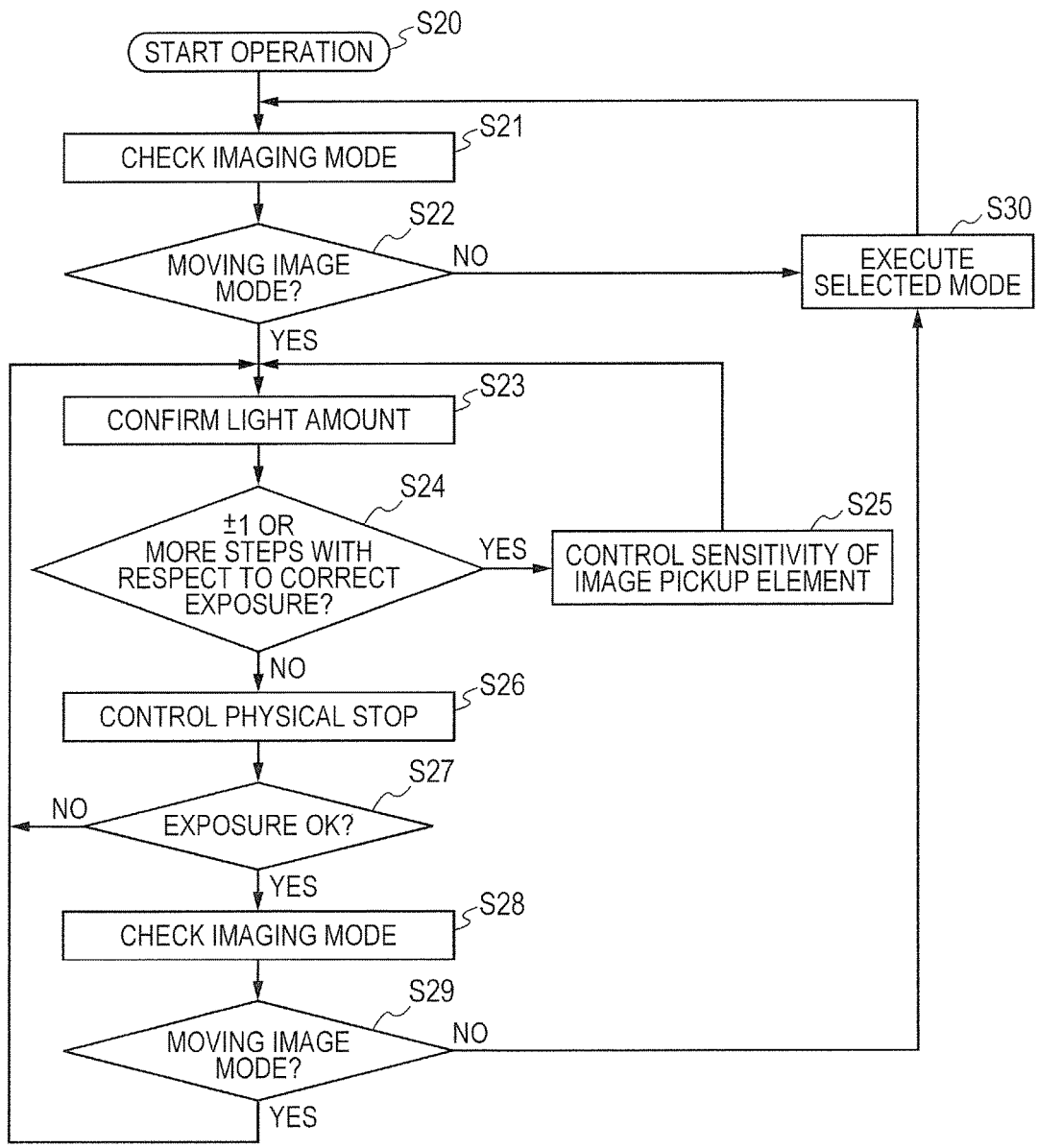
FIG. 5 is a flow chart for illustrating light amount adjusting operation in a moving image mode of a camera system according to a second embodiment of the present invention.

A second embodiment of the present invention is described below with reference to the attached drawings. An adapter and a camera system according to this embodiment are schematically similar to those in the first embodiment, and thus, description thereof is omitted. FIG. 5 is a flow chart for illustrating light amount adjusting operation in taking a moving image of the camera system 1 according to this embodiment. First, in Step (denoted as S in FIG. 5) 20, operation of the interchangeable lens 100, the adapter 200, and the camera main body 300 is started. Then, in Step 21, the imaging mode set in the camera main body 300 is checked.

Then, in Step 22, whether or not the imaging mode is the moving image mode is determined. When the imaging mode is the moving image mode, the process proceeds to Step 23. When a mode other than the moving image mode is selected, the process proceeds to Step 30. In Step 23, the amount of light entering the image pickup element 301 is confirmed. In Step 24, the extent to which the transmissivity of the physical stop 201 is to be increased or reduced is calculated by the adapter CPU 203 based on the light amount confirmed in Step 23. Whether or not the result of the calculation (light amount adjustment amount) exceeds a predetermined control range (specifically, whether or not the light amount. adjustment amount corresponds to a control amount of ±1 or more steps) is determined.

When the control amount is ±1 or more steps, the process proceeds to Step 25 and the sensitivity of the image pickup element 301 is raised or lowered. When the control amount is less than ±1 step, the process proceeds to Step 26. In Step 26, a signal is output from the physical stop driving circuit 202 to the physical stop 201. In Step 27, whether the exposure is at an appropriate level (OK) or not (NG) is determined. In the case of OK, the process proceeds to Step 28. In the case of NO, the process returns to Step 23.

In Step 28, the imaging mode is checked again. In Step 29, whether or not the imaging mode is the moving image mode is determined. When the imaging mode is the moving image mode, the process returns to Step 23. When a mode other than the moving image mode is selected, the process proceeds to Step 30.

As described above, in the moving image mode, when the light amount adjustment amount is equal to or larger than ±1 step as a predetermined value, the sensitivity of the image pickup element is changed. When the light amount adjustment amount is smaller than the predetermined value, the light amount is adjusted using only the physical stop 201. According to this embodiment, ±1 step is used as the predetermined value, but the predetermined value used is not limited thereto. According to this embodiment, in the moving image mode, driving of the mechanical stop 102 is regulated, and thus, driving noise of a stop can be prevented. In addition, compared with a case in which only the physical stop 201 is used, a wider range of light amount adjustment can be made.

[Third Embodiment]

Figure 6:
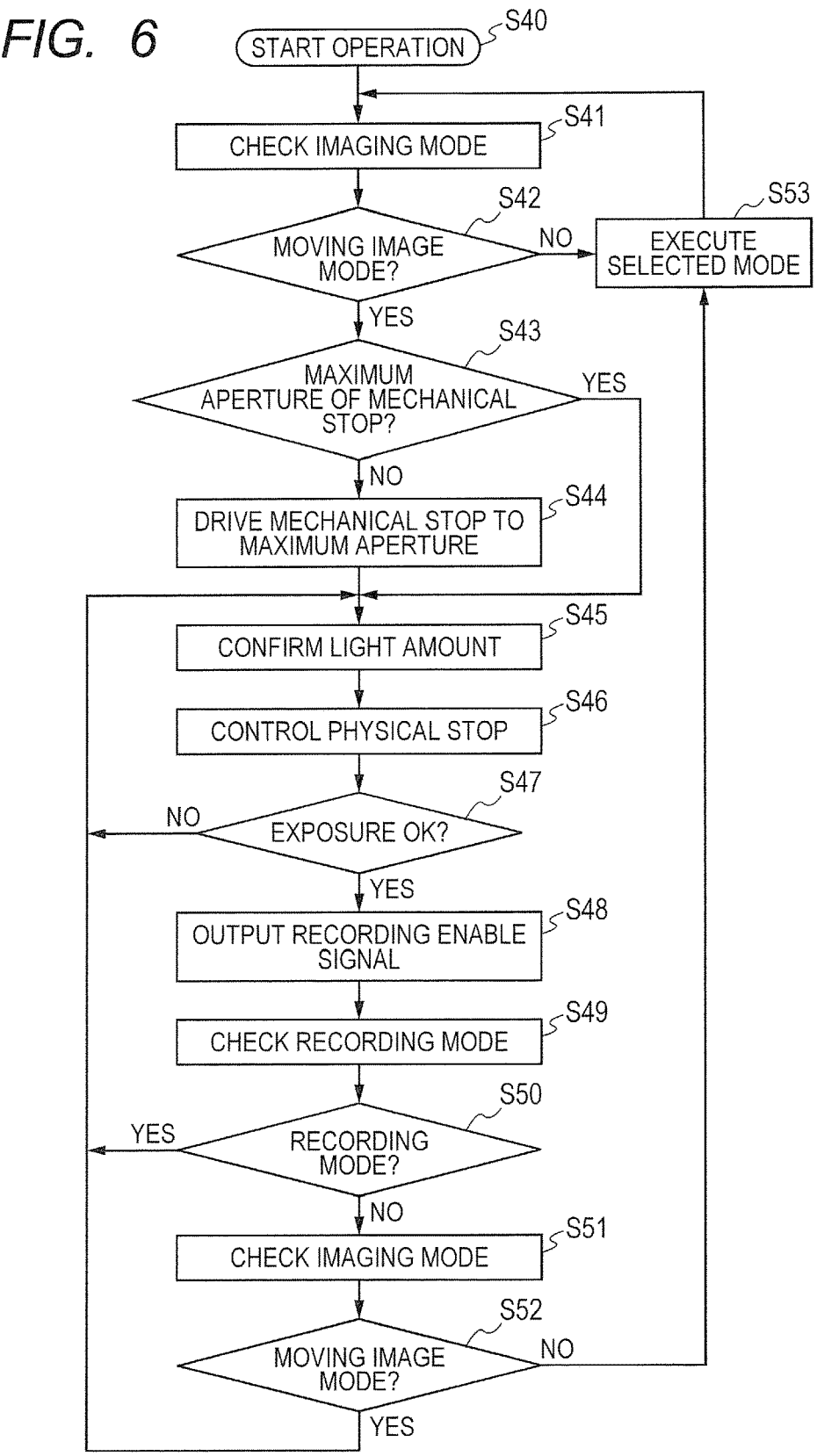
FIG. 6 is a flow chart for illustrating light amount adjusting operation in a moving image mode of a camera system according to a third embodiment of the present invention.

A third embodiment of the present invention is described below with reference to the attached drawings. An adapter and a camera system according to this embodiment are schematically similar to those in the first embodiment, and thus, description thereof is omitted. FIG. 6 is a flow chart for illustrating light amount adjusting operation in taking a moving image of the camera system 1 according to this embodiment. First, in Step (denoted as S in FIG. 6) 40, operation of the interchangeable lens 100, the adapter 200, and the camera main body 300 is started. Then, in Step 41, the imaging mode set in the camera main body 300 is checked.

Then, in Step 42, whether or not the imaging mode is the moving image mode is determined. When the imaging mode is the moving image mode, the process proceeds to Step 43. When a mode other than the moving image mode is selected, the process proceeds to Step 53. In Step 43, whether or not the mechanical stop 102 is in a maximum aperture state (aperture area is at the maximum) is determined. In the case of the maximum aperture state, the process proceeds to Step 45. When the state is not the maximum, aperture state, the process proceeds to Step 44, where the mechanical stop 102 is driven to be in the maximum aperture state, and then, the process proceeds to Step 4. In Step 45, the amount of light entering the image pickup element 301 is confirmed.

In Step 46, the extent to which the transmissivity of the physical stop 201 is to be increased or reduced is calculated by the adapter CPU 203 based on the light amount confirmed in Step 45, and a signal is output from the physical stop driving circuit 202 to the physical stop 201. In Step 47, whether the exposure is at an appropriate level (OK) or not (NG) is determined. In the case of OK, the process proceeds to Step 48. In the case of NG, the process returns to Step 45. In Step 48, a recording enable signal is output from the adapter CPU 203 to the camera CPU 304.

The camera CPU 304 ignores a signal from the recording switch 305 until reception of the recording enable signal. After the recording enable signal is received, when the camera CPU 304 receives a recording start signal from the recording switch 305, recording is started. In Step 49, whether or not a moving image is being recorded is checked.

In Step 50, whether or not a moving image is being recorded is determined. When a moving image is being recorded, the process returns to Step 45. When a moving image is not being recorded, the process proceeds to Step 51. In Step 51, the imaging mode is checked again. In Step 52, whether or not the imaging mode is the moving image mode is determined. When the imaging mode is the moving image mode, the process returns to Step 45. When a mode other than the moving image mode is selected, the process proceeds to Step 53.

As described above, when the moving image mode is started, the mechanical stop 102 is driven to be in the maximum aperture state before the recording is started. After that, the light amount is adjusted using only the physical stop 201. When the recording is ended and a mode other than the moving image mode is set, the set imaging mode is executed. During recording in the moving image mode, control of driving of the mechanical stop 102 is prohibited except for a case in which the mechanical stop 102 is driven to be in the maximum aperture state in Step 44.

Therefore, while a moving image is taken, driving noise of a stop caused through light amount adjustment can be prevented from being recorded. Further, in the moving image mode, the mechanical stop 102 is in the maximum aperture state, and thus, even under circumstances where the amount of incident light is small in imaging, the light amount can be adjusted appropriately using only the physical stop 201.

[Fourth Embodiment]

Figure 7:
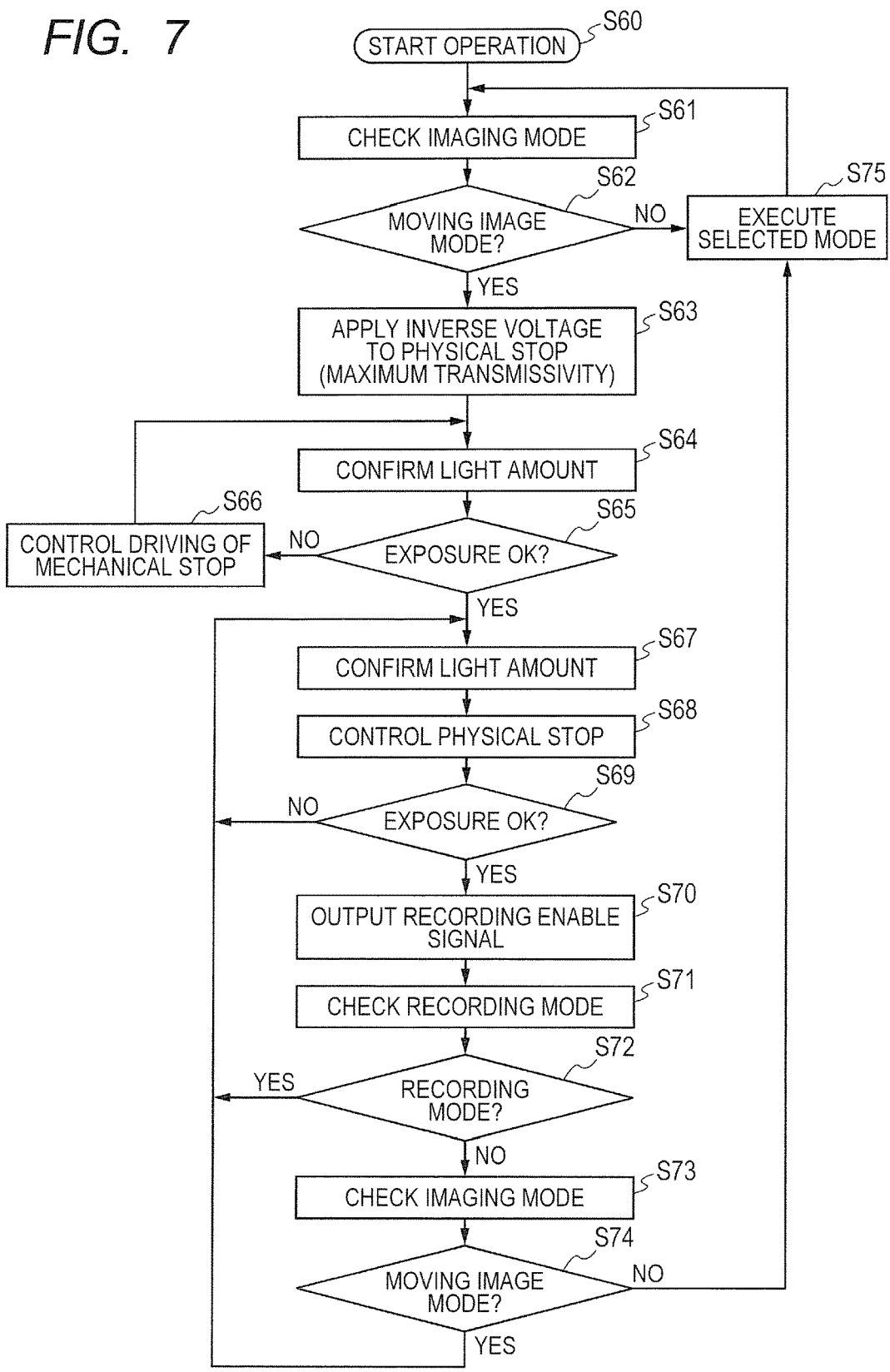
FIG. 7 is a flow chart for illustrating light amount adjusting operation in a moving image mode of a camera system according to a fourth embodiment of the present invention.

A fourth embodiment of the present invention is described below with reference to the attached drawings. An adapter and a camera system according to this embodiment are schematically similar to those in the first embodiment, and thus, description thereof is omitted. FIG. 7 is a flow chart for illustrating light amount adjusting operation in taking a moving image of the camera system 1 according to this embodiment. First, in Step (denoted as S in FIG. 7) 60, operation of the interchangeable lens 100, the adapter 200, and the camera main body 300 is started. Then, in Step 61, the imaging mode set in the camera main body 300 is checked.

Then, in Step 62, whether or not the imaging mode is the moving image mode is determined. When the imaging mode is the moving image mode, the process proceeds to Step 63. When a mode other than the moving image mode is selected, the process proceeds to Step 75. In Step 63, an inverse voltage is applied to the physical stop 201 so that the transmissivity may be at the maximum. After that, in Step 64, the amount of light entering the image pickup element 301 is confirmed. In Step 65, whether the exposure confirmed in Step 64 is at an appropriate level (OK) or not (NC) is determined.

In the case of OK, the process proceeds to Step 67. In the case of NC, the process proceeds to Step 66. In Step 66, the extent to which the aperture area of the mechanical stop 102 is to be increased or reduced is calculated by the lens CPU 104 based on the light amount confirmed in Step 64, and a signal is output from a mechanical stop driving circuit 103 to the mechanical stop 102. Then, the process returns to Step 64, where the light amount is confirmed again. In Step 67, the amount of light entering the image pickup element 301 is confirmed.

In Step 68, the extent to which the transmissivity of the physical stop 201 is to be increased or reduced is calculated by the adapter CPU 203 based on the light amount confirmed in Step 67, and a signal is output from the physical stop driving circuit 202 to the physical stop 201. In Step 69, whether the exposure is at an appropriate level (OK) or not (NG) is determined. In the case of OK, the process proceeds to Step 70. In the case of NG, the process returns to Step 67.

In Step 70, a recording enable signal is output from the adapter CPU 203 to the camera CPU 304. The camera CPU 304 ignores a signal from the recording switch 305 until reception of the recording enable signal. After the recording enable signal is received, when the camera CPU 304 receives a recording start signal from the recording switch 305, recording is started. In Step 71, whether or not the mode is a moving image recording mode is checked. Then, in Step 72, whether or not a moving image is being recorded is determined. When a moving image is being recorded, the process returns to Step 67. When a moving image is not being recorded, the process proceeds to Step 73.

In Step 73, the imaging mode is checked again. In Step 74, whether or not the imaging mode is the moving image mode is determined. When the imaging mode is the moving image mode, the process returns to Step 67. When a mode other than the moving image mode is selected, the process proceeds to Step 75.

As described above, when the moving image mode is started, immediately after the start, the mechanical stop 102 is used to obtain an appropriate exposure state. After that, the light amount is adjusted using only the physical stop 201 including a case in which a moving image is being recorded. When the recording is ended and a mode other than the moving image mode is set, the set imaging mode is executed. During recording in the moving image mode, driving of the mechanical stop 102 is prohibited. Therefore, while a moving image is taken, driving noise of a stop caused through light amount adjustment can be prevented from being recorded.

Further, at the start of the moving image mode, the mechanical stop 102 is driven to obtain an appropriate exposure state. Therefore, even when the amount of change in light transmissivity of the physical stop 201 is small, the light amount can be adjusted appropriately during recording of a moving image through use of the physical stop 201.

Further, Step 65 in the operation flow according to this embodiment may determine not whether or not the exposure is at an appropriate level but whether or not the light amount of the exposure has a predetermined value that is larger by, for example, +1 step, with respect to an appropriate level of exposure.

[Fifth Embodiment]

(Camera System)

Figure 9:
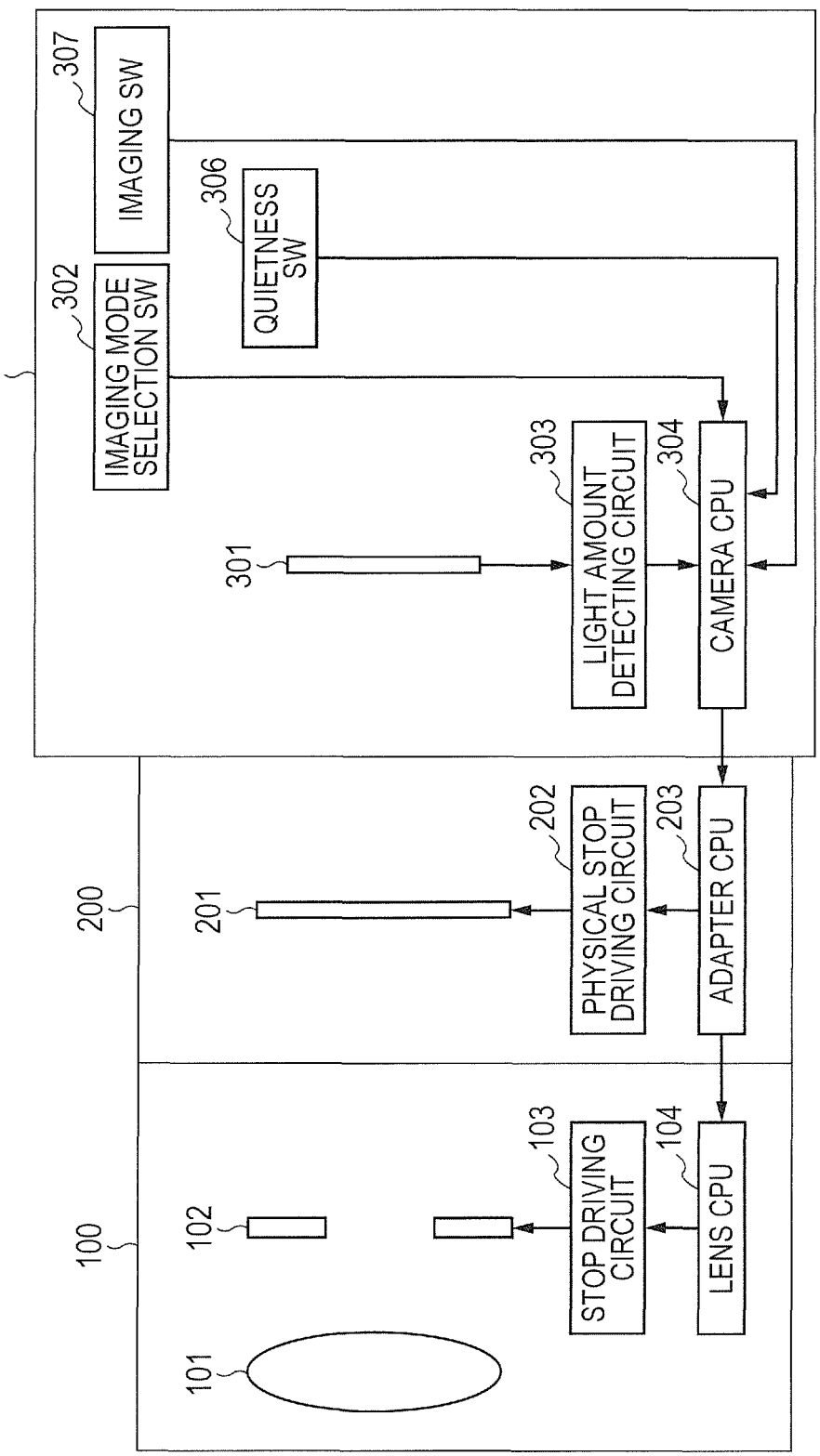
FIG. 9 is a schematic view of a camera system including an adapter, an interchangeable lens, and a camera main body according to a fifth embodiment of the present invention.

FIG. 9 is a schematic view of a camera system serving as an image pickup apparatus including an adapter, an interchangeable lens, and a camera main body according to an embodiment of the present invention. A camera system 3 includes the interchangeable lens 100 serving as an imaging optical system, a camera main body 400, and the adapter 200 mountable between the interchangeable lens 100 and the camera main body 400. The interchangeable lens 100 and the adapter 200 are schematically similar to those in the first embodiment, and thus, description thereof is omitted.

The camera main body 400 includes the image pickup element 301 configured to receive imaging light, the imaging mode selection switch 302 that can select an imaging mode among a plurality of imaging modes, the light amount detecting circuit 303, the camera CPU 304, a quietness switch 306, and an imaging switch 307. The imaging mode selection switch 302 configured to select an imaging mode is a selection switch, e.g., a dial switch, and switching between the still image mode and the moving image mode can be performed. The imaging switch 307 is a push button or the like, and is a shutter release button when a still image is taken. The quietness switch 306 is, for example, a slide switch, and switching between. ON and OFF of quiet imaging can be performed.

(Light Amount Adjusting Operation Flow when Still Image is Quietly Taken according to this Embodiment)

Figure 10:
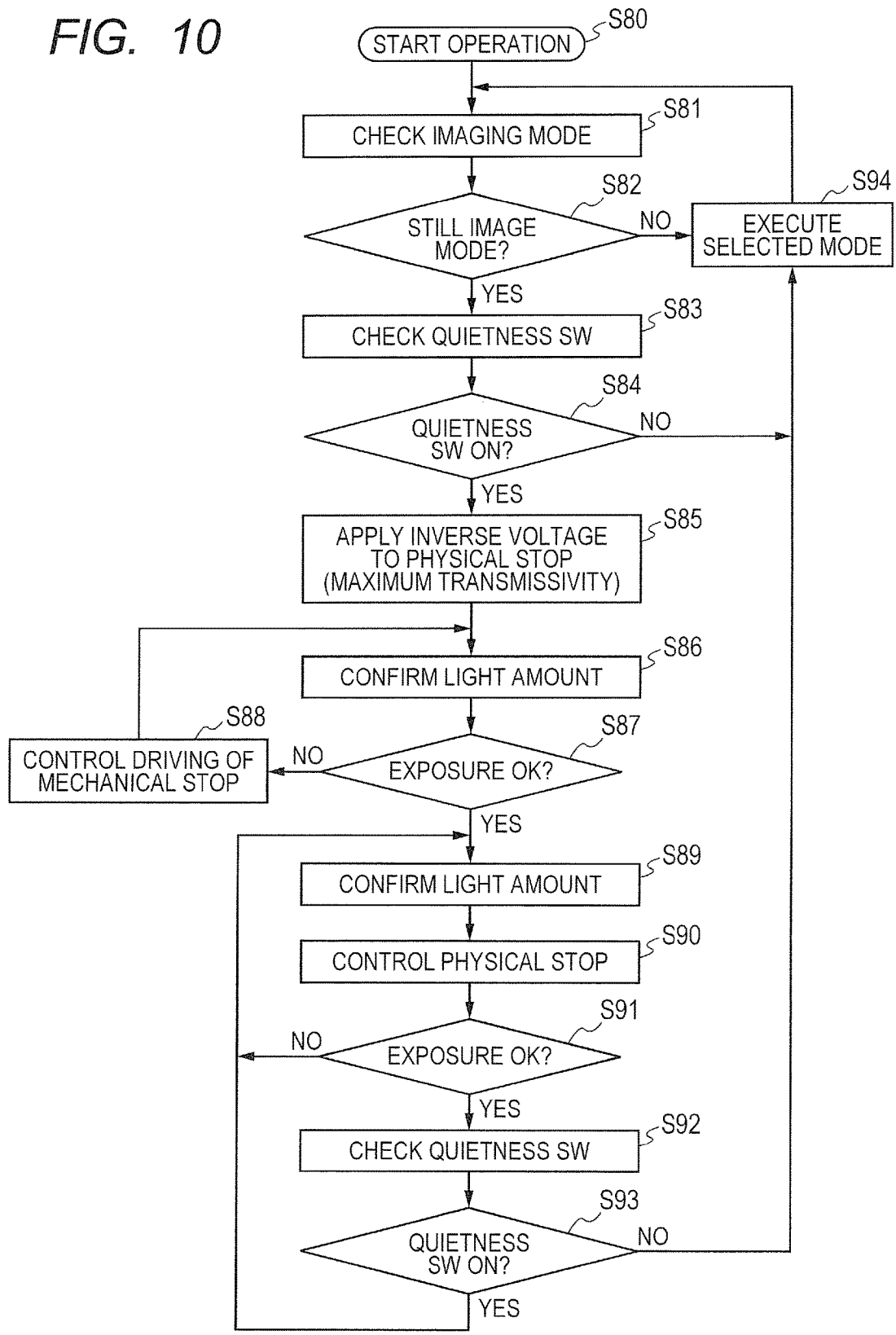

FIG. 10 is a flow chart for illustrating light amount adjusting operation in quietly taking a still image of the camera system 1 according to this embodiment. First, in Step 80, operation of the interchangeable lens 100, the adapter 200, and the camera main body 400 is started. Then, in Step 81, the imaging mode set in the camera main body 400 is checked.

Then, in Step 82, whether or not the imaging mode is the still image mode is determined. When the imaging mode is the still image mode, the process proceeds to Step 83. When a mode other than the still image mode is selected, the process proceeds to Step 94, and the selected mode is executed. In Step 83, the quietness switch 306 of the camera main body 400 is checked. Then, in Step 84, whether or not the quietness switch 306 is ON is determined. In the case of ON, the process proceeds to Step 85. In the case of OFF, the process proceeds to Step 94, and the selected mode is executed. In Step 85, an inverse voltage is applied to the physical stop 201 so that the transmissivity may be at the maximum. After that, in Step 86, the amount of light entering the image pickup element 301 is confirmed. In Step 87, whether the exposure confirmed in Step 87 is at an appropriate level (OK) or not (NO) is determined.

In the case of OK, the process proceeds to Step 89. In the case of NG, the process proceeds to Step 88. In Step 88, the extent to which the aperture area of the mechanical stop 102 is to be increased or reduced is calculated by the lens CPU 104 based on the light amount confirmed in Step 87, and a signal is output from the mechanical stop driving circuit 103 to the mechanical stop 102. Then, the process returns to Step 86, where the light amount is confirmed again. In Step 89, the amount of light entering the image pickup element 301 is confirmed.

In Step 90, the extent to which the transmissivity of the physical stop 201 is to be increased or reduced is calculated by the adapter CPU 203 based on the light amount confirmed in Step 89, and a signal is output from the physical stop driving circuit 202 to the physical stop 201. In Step 91, whether the exposure is at an appropriate level (OK) or not (NG) is determined. In the case of OK, the process proceeds to Step 92. In the case of NG, the process returns to Step 89.

In Step 92, the quietness switch 306 of the camera main body 400 is checked. In Step 93, whether or not the quietness switch 306 of the camera main body 400 is ON is determined. In the case of ON, the process proceeds to Step 89. In the case of OFF, the process proceeds to Step 94.

As described above, when the imaging mode is the still image mode and immediately after the quietness switch 306 is set to be ON, the mechanical stop 102 is used to obtain an appropriate exposure state. After that, the light amount is adjusted using only the physical stop 201 until the quietness switch 306 is turned off. When the quietness switch 306 is set to be OFF, the selected imaging mode is executed. When the quietness switch 306 is set to be ON, after the mechanical stop 102 is driven once, driving of the mechanical stop 102 is prohibited. Therefore, even when a still image is taken where quietness is required, driving noise of a stop caused through light amount adjustment can be prevented from being generated.

Step 86 in the operation flow according to this embodiment may determine not whether or not the exposure is at an appropriate level but whether or not the light amount of the exposure has a predetermined value that is larger by, for example, +1 step, with respect to an appropriate level of exposure.

MODIFIED EXAMPLES

In the above, exemplary embodiments of the present invention are described in which driving of at least one of the second light amount adjustment unit configured to mechanically change the area through which the imaging light passes or the first light amount adjustment unit configured to change the transmissivity of the imaging light through change in physical property thereof is controlled depending on the imaging mode. However, the present invention is not limited to those embodiments, and various modifications and variations are possible within the gist thereof.

Modified Example 1

Figure 8:
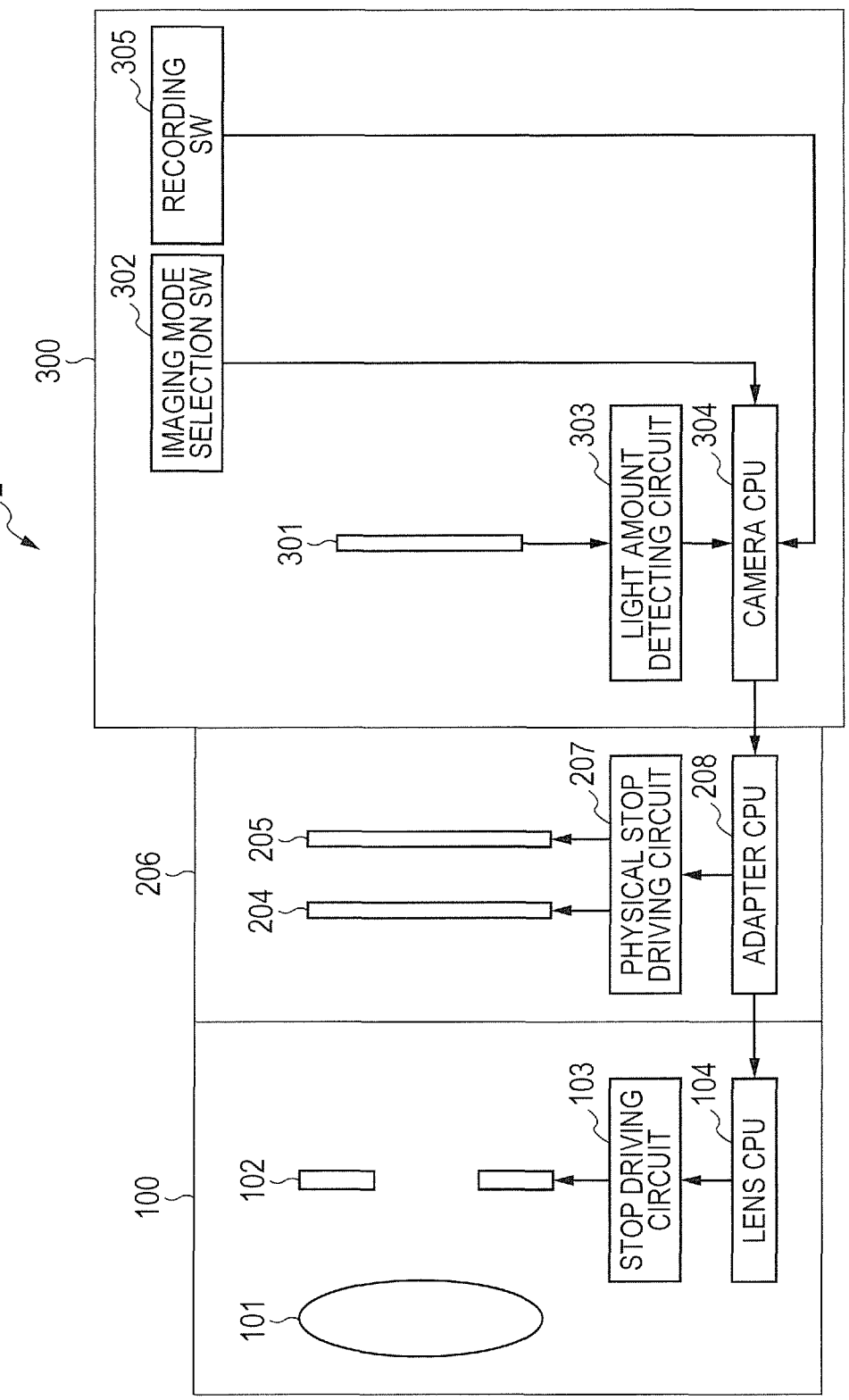
FIG. 8 is a schematic view of a camera system according to a modified example that includes two or more physical stops and that adjusts a light amount through combination of changes in transmissivity of the respective physical stops.

In the embodiments described above, an electrochromic element is used as the physical stop. However, other elements using a chemical reaction, e.g., a liquid crystal element may also be used. Further, cases in which one physical stop is included in the adapter are described, but the present invention is not limited thereto. For example, as illustrated in FIG. 8, a plurality of physical stops (for example, two physical stops such as physical stops 204 and 205, or three or more physical stops) may be included in an adapter 206, and further, the light amount may be adjusted through combination of changes in transmissivity of the respective physical stops. Through inclusion of two or more physical stops, a wider change in the number of stops for adjusting the light amount may be made.

Further, a blurred image may be changed through change in the number of stops for adjusting the light amount depending on the location at which the light amount is changed, for example, whether the location is on the periphery or in the vicinity of a center of an image pickup surface.

Modified Example 2

In the embodiments described above, there are described configurations in which the adapter 200 mountable between the interchangeable lens 100 and the camera main body 300 includes the light amount adjustment unit 201 configured to change the transmissivity of imaging light through change in physical property thereof, but the present invention is not limited thereto. The light amount adjustment unit 201 configured to change the transmissivity of imaging light through change in physical property thereof may be fixedly arranged in the interchangeable lens 100 or the camera main body 300.

Specifically, the interchangeable lens 100 may include the second light amount adjustment unit configured to mechanically change the area through which the imaging light passes and the first light amount adjustment unit arranged on an emission side with respect to the second light amount adjustment unit and configured to change the transmissivity of the imaging light through change in physical property thereof.

Alternatively, the camera main body 300 may include the image pickup element and a light amount adjustment unit arranged on an incident side with respect to the image pickup element and configured to change the transmissivity of the imaging light through change in physical property thereof.

Modified Example 3

In the third embodiment described above, in the moving image mode, the second light amount adjustment unit (mechanical stop) is driven to be in the maximum aperture state before driving of the first light amount adjustment unit (physical stop) is controlled, but the second light amount adjustment unit (mechanical stop) may be driven to be in a predetermined diameter state that is different from the maximum aperture state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-188318, filed Sep. 25, 2015, and Japanese Patent Application No. 2016-178508, filed Sep. 13, 2016, which are hereby incorporated by reference herein in their entirety.

What is claimed is:

1. An optical apparatus configured to guide light from an object to an image pickup element, the optical apparatus comprising:
   a first light amount adjustment unit configured to change transmissivity of the light from the object by change in physical property thereof; and
   a first driving circuit configured to be able to output a first signal to the first light amount adjustment unit,
   wherein the optical apparatus is an adapter mountable between an interchangeable lens and a camera main body including the image pickup element or the interchangeable lens mountable to the camera main body, the interchangeable lens including a second light amount adjustment unit configured to mechanically change an area through which the light from the object passes and a second driving circuit configured to be able to output a second signal to the second light amount adjustment unit,
   wherein, before a recording in a moving image mode is started, the transmissivity of the first light amount adjustment unit is adjusted to a maximum and the second light amount adjustment unit is driven to adjust the amount of the light from the object entering the image pickup element by the second driving circuit, and
   wherein, after the recording in the moving image mode is started, the first light amount adjustment unit is driven to adjust an amount of the light from the object entering the image pickup element by the first driving circuit, while the second light amount adjustment unit is prevented from being driven by not outputting the second signal to the second light amount adjustment unit from the second driving circuit.

2. An optical apparatus according to claim 1, wherein the first light amount adjustment unit comprises an element capable of changing the transmissivity of the light from the object by application of a voltage thereto.

3. An optical apparatus according to claim 1, wherein the optical apparatus is the adapter, and
   wherein the camera main body can be operated in the moving image mode and includes a recording switch configured to start the recording.

4. An optical apparatus according to claim 3, further comprising:
   a first mount surface to which the interchangeable lens is mounted; and
   a second mount surface to which the camera main body is mounted.

5. An optical apparatus according to claim 1,
   wherein the optical apparatus is the interchangeable lens,
   wherein the interchangeable lens further includes an imaging optical system configured to guide the light from the object to the image pickup element, and
   wherein
   the first light amount adjustment unit is arranged on an emission side with respect to the second light amount adjustment unit.

6. An optical apparatus according to claim 1, wherein the second light amount adjustment unit can be driven to adjust the amount of the light from the object entering the image pickup element before the recording is started, and
   wherein the second light amount adjustment unit cannot be driven to adjust the amount of the light from the object entering the image pickup element after the recording is started.

7. A camera system comprising:
   an image pickup element configured to receive light from an object;
   a first light amount adjustment unit configured to change transmissivity of the light from the object by change in physical property thereof;
   an imaging optical system configured to guide the light from the object to the image pickup element;
   a second light amount adjustment unit configured to mechanically change an area through which the light from the object passes; and
   a control unit configured to control the first light amount adjustment unit and the second light amount adjustment unit, the control unit including a first driving circuit configured to be able to output a first signal to the first light amount adjustment unit and a second driving circuit configured to be able to output a second signal to the second light amount adjustment unit,
   wherein, before a recording in a moving image mode is started, the transmissivity of the first light amount adjustment unit is adjusted to a maximum and the second light amount adjustment unit is driven to adjust the amount of the light from the object entering the image pickup element by the second driving circuit, and
   wherein, after the recording in the moving image mode is started, the first light amount adjustment unit is driven to adjust an amount of the light from the object entering the image pickup element by the first driving circuit, while the second light amount adjustment unit is prevented from being driven by not outputting the second signal to the second light amount adjustment unit from the second driving circuit.

8. A camera system according to claim 7, wherein the control unit is configured to control, in the moving image mode, before controlling the driving of the first light amount adjustment unit, sensitivity of the image pickup element when a light amount adjustment amount exceeds a predetermined control range.

9. A camera system according to claim 7, wherein the control unit is configured to cause, in the moving image mode, before controlling the driving of the first light amount adjustment unit, the second light amount adjustment unit to be in one of a maximum aperture state and a predetermined diameter state.

10. A camera system according to claim 7, wherein the control unit is configured to control, in a still image mode, the driving of the second light amount adjustment unit.

11. A camera system according to claim 7, further comprising:
a quiet imaging switch configured to start a quiet imaging mode,
wherein, when the quiet imaging switch is OFF, the control unit controls the driving of the second light amount adjustment unit, and, when the quiet imaging switch is ON, the control unit is prevented from driving the second light amount adjustment unit but drives the first light amount adjustment unit.

12. A camera system according to claim 7, wherein the first light amount adjustment unit comprises a plurality of first light amount adjustment units.

13. A camera system according to claim 7, wherein the second light amount adjustment unit can be driven to adjust the amount of the light from the object entering the image pickup element before the recording is started, and wherein the second light amount adjustment unit cannot be driven to adjust the amount of the light from the object entering the image pickup element after the recording is started.

14. An optical apparatus comprising:
an image pickup element configured to receive light from an object;
a first light amount adjustment unit configured to change transmissivity of the light from the object by change in physical property thereof;
a first driving circuit configured to be able to output a first signal to the first light amount adjustment unit;
a second light amount adjustment unit configured to mechanically change an area through which the light from the object passes; and
a second driving circuit configured to be able to output a second signal to the second light amount adjustment unit,
wherein the first light amount adjustment unit is arranged on an incident side with respect to the image pickup element,
wherein, before a recording in a moving image mode is started, the transmissivity of the first light amount adjustment unit is adjusted to a maximum and the second light amount adjustment unit is driven to adjust the amount of the light from the object entering the image pickup element by the second driving circuit, and
wherein, after the recording in the moving image mode is started, the first light amount adjustment unit is driven to adjust an amount of the light from the object entering the image pickup element by the first driving circuit, while the second light amount adjustment unit is prevented from being driven by not outputting the second signal to the second light amount adjustment unit from the second driving circuit.

* * * * *